(12) United States Patent
Yamamoto et al.

(10) Patent No.: US 9,081,194 B2
(45) Date of Patent: Jul. 14, 2015

(54) THREE-DIMENSIONAL IMAGE DISPLAY APPARATUS, METHOD AND PROGRAM

(75) Inventors: Takuma Yamamoto, Yokohama (JP);
Yasunori Taguchi, Kawasaki (JP);
Nobuyuki Matsumoto, Inagi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 164 days.

(21) Appl. No.: 13/240,345

(22) Filed: Sep. 22, 2011

(65) Prior Publication Data

US 2012/0113101 A1 May 10, 2012

(30) Foreign Application Priority Data

Nov. 10, 2010 (JP) ................................. 2010-252337

(51) Int. Cl.
*G06T 15/00* (2011.01)
*H04N 13/04* (2006.01)
*H04N 13/02* (2006.01)
*G02B 27/22* (2006.01)
*H04N 13/00* (2006.01)

(52) U.S. Cl.
CPC ............ *G02B 27/22* (2013.01); *H04N 13/0007* (2013.01); *H04N 13/0404* (2013.01); *H04N 13/0447* (2013.01); *H04N 13/0468* (2013.01); *H04N 13/004* (2013.01); *H04N 13/0475* (2013.01); *H04N 13/0477* (2013.01); *H04N 13/0481* (2013.01)

(58) Field of Classification Search
USPC ........................................................ 345/419
See application file for complete search history.

(56) References Cited

U.S. PATENT DOCUMENTS

2008/0068372 A1* 3/2008 Krah ............................. 345/419
2008/0079805 A1 4/2008 Takagi et al.
2010/0060983 A1* 3/2010 Wu et al. ....................... 359/466

(Continued)

FOREIGN PATENT DOCUMENTS

JP 08-331600 12/1996
JP 09-74573 3/1997

(Continued)

OTHER PUBLICATIONS

First Office Action mailed by the Japanese Patent Office on Sep. 25, 2012, in the corresponding Japanese Application No. 2010-252337, 2 pages.

(Continued)

*Primary Examiner* — Mark Zimmerman
*Assistant Examiner* — Sohum Kaji
(74) *Attorney, Agent, or Firm* — Finnegan, Henderson, Farabow, Garrett & Dunner, LLP (57) ABSTRACT

According to one embodiment, a three-dimensional image display apparatus includes a display unit and a generating unit. The display unit includes a two-dimensional image display device includes a display surface with a plurality of pixels arranged in a matrix, and a plurality of light ray control elements provided on the display surface of the two-dimensional image display device corresponding to the pixels. The generating unit generates an optimal elemental image by determining a value of at least one pixel from a weighted sum of values of at least two pixels of a generated image or an input image, and weights calculated based on light ray distributions indicating directions and scattering degrees of light rays from the light ray control elements. The display unit displays the optimal elemental image.

16 Claims, 9 Drawing Sheets

(56) References Cited

U.S. PATENT DOCUMENTS

| | | | |
|---|---|---|---|
| 2010/0134493 A1 | 6/2010 | Kwak et al. | |
| 2011/0141244 A1* | 6/2011 | Vos et al. | 348/51 |

FOREIGN PATENT DOCUMENTS

| | | | | |
|---|---|---|---|---|
| JP | 09-101482 | 4/1997 | | |
| JP | 2004-212666 | 7/2004 | | |
| JP | 2005-250167 | 9/2005 | | |
| JP | 2008-89787 | 4/2008 | | |
| JP | 2009-251098 | 10/2009 | | |
| JP | 2010-224129 | 10/2010 | | |
| WO | WO-2005009052 | * 7/2003 | ............ H04N 13/02 |
| WO | WO 2005009052 A1 | * 1/2005 | |

OTHER PUBLICATIONS

Taiwanese Patent Office, Translation of Office Action and search report corresponding to Taiwan Patent Application No. 100132259, dated Jul. 30, 2014.

* cited by examiner

THREE-DIMENSIONAL IMAGE DISPLAY APPARATUS, METHOD AND PROGRAM

CROSS-REFERENCE TO RELATED APPLICATIONS

This application is based upon and claims the benefit of priority from prior Japanese Patent Application No. 2010-252337, filed Nov. 10, 2010, the entire contents of which are incorporated herein by reference.

FIELD

Embodiments described herein relate generally to a three-dimensional image display apparatus, method and program.

BACKGROUND

Apparatuses for displaying three-dimensional images viewable with the naked eyes have recently been developed. One such apparatus exploits an integral imaging (II) scheme, which allows an image to be viewed such that its aspect varies in accordance with changes in viewpoint of the observer. In an II display apparatus, a plurality of such light ray control elements as lenses and barriers for controlling the directions and distributions of light rays are provided in front of a conventional two-dimensional image display to produce different images for the right and left eyes and so create a stereoscopic effect.

However, the II scheme has the disadvantage that when an image is seen from a certain viewpoint, multiple images and blurring can occur. This effect will be referred to as "multiple blurring."

DETAILED DESCRIPTION

In general, according to one embodiment, a three-dimensional image display apparatus includes a display unit and an optimal elemental image generating unit. The display unit includes a two-dimensional image display device comprising a display surface with a plurality of pixels arranged in a matrix, and a plurality of light ray control elements provided on the display surface of the two-dimensional image display device in accordance with positions of elemental images as display data items corresponding to the pixels. The light ray control elements control light rays from the pixels. The optimal elemental image generating unit generates an optimal elemental image by determining a value of at least one pixel from a weighted sum of values of at least two pixels of a generated image or an input image, that is an initial elemental image as a tentative elemental image, and weights calculated based on light ray distributions indicating directions and scattering degrees of light rays from the light ray control elements. The display unit displays the optimal elemental image.

Embodiments provide three-dimensional image display apparatuses, methods and programs for reducing multiple blurred images.

Referring to the accompanying drawings, the three-dimensional image display apparatuses, methods and programs of the embodiments will now be described in detail. In the embodiments, like reference numbers denote like elements, and duplicate explanations will be avoided.

Referring first to FIGS. 1 to 6, a description will be given of the principle of occurrence of multiple blurred images.

Figure 1:
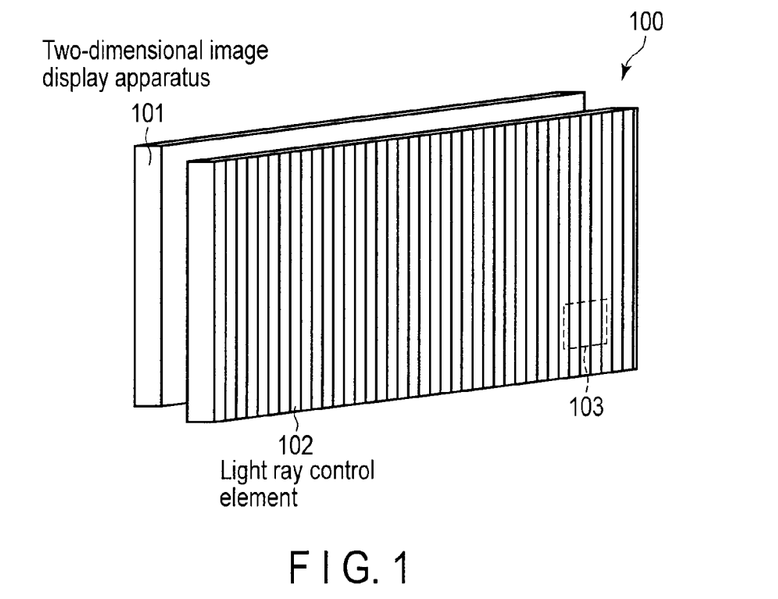
FIG. 1 is an exemplary schematic view illustrating a three-dimensional image display apparatus.
Figure 2:
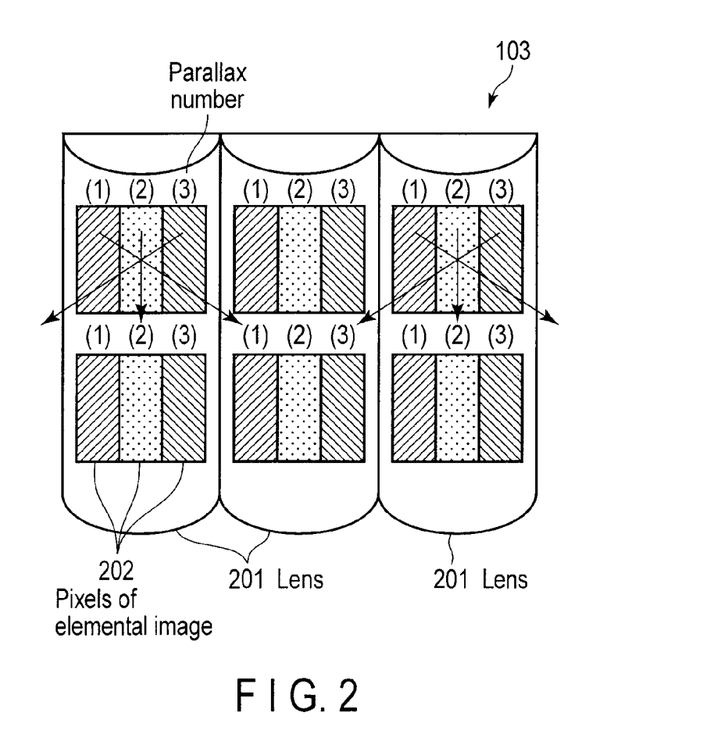
FIG. 2 is an exemplary enlarged view illustrating a part of the three-dimensional image display apparatus.
Figure 3:
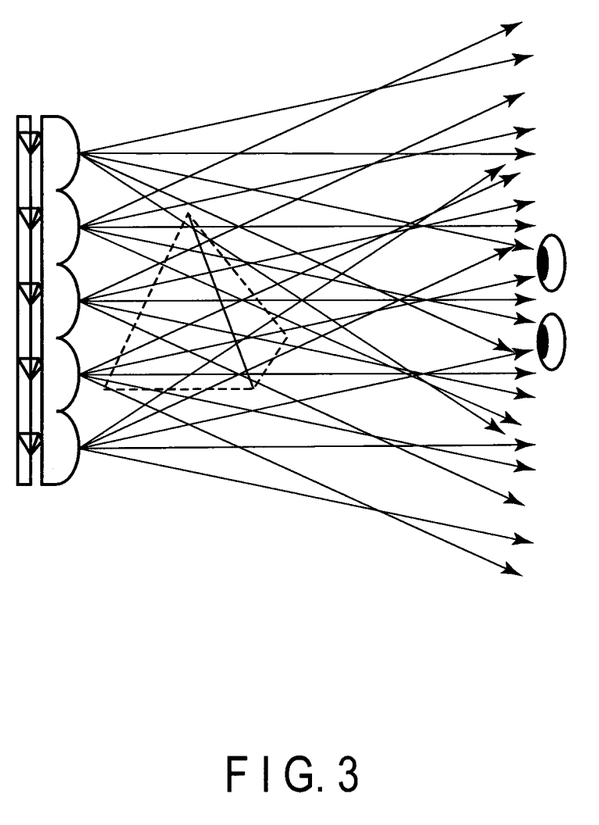
FIG. 3 is an exemplary conceptual diagram useful in explaining how a three-dimensional image of the II scheme is viewed.
Figure 4:
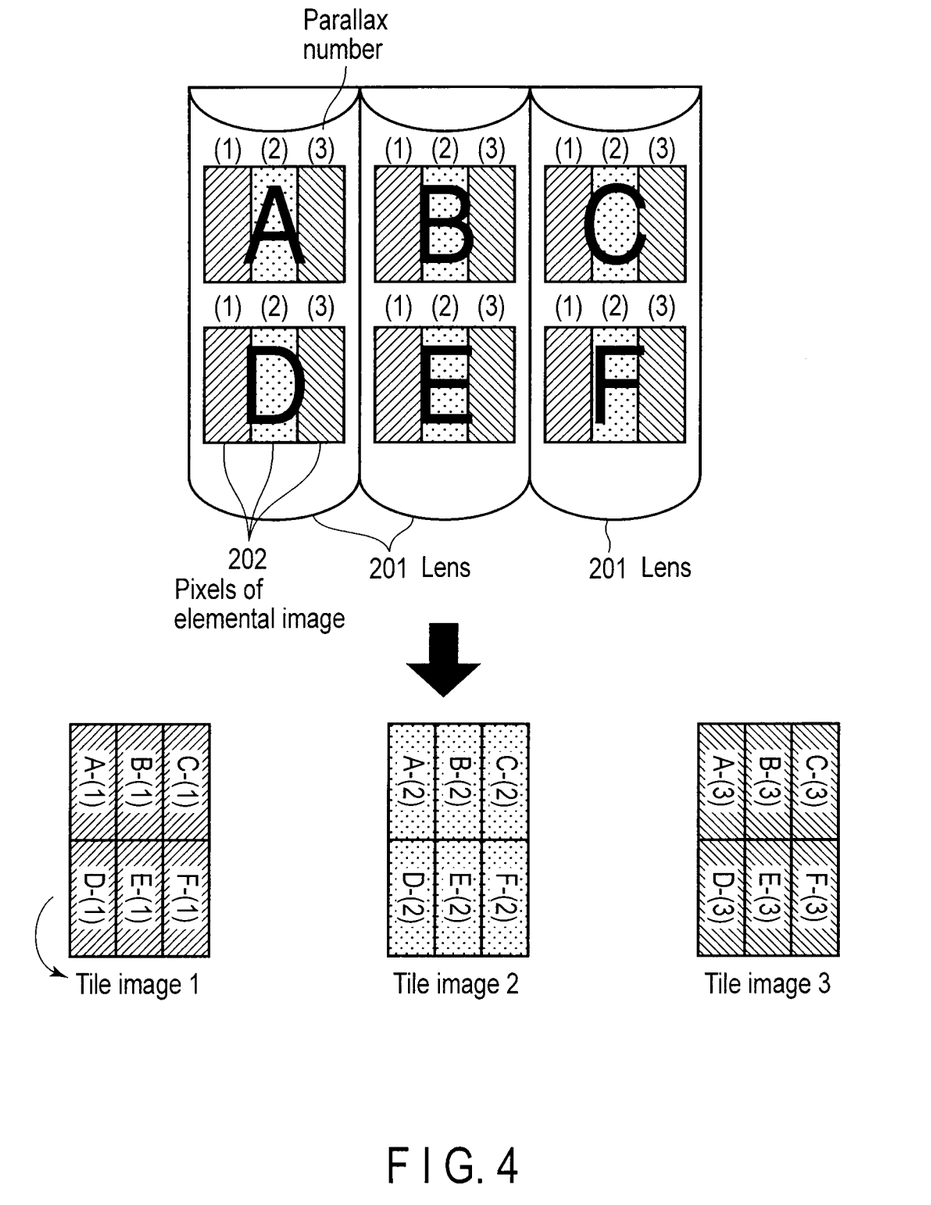
FIG. 4 is an exemplary conceptual diagram illustrating the relationship between elemental images and tile images.

As mentioned above, a lens array, as an array of light ray control elements 102 for sending different images to the right and left eyes, is provided in front of a two-dimensional image display apparatus 101 incorporated in a three-dimensional image display apparatus 100 of the II scheme. In particular, a scheme that uses a lenticular sheet for controlling light rays only horizontally is called one-dimensional II (hereinafter, 1D-II) scheme. FIG. 2 is an enlarged view of the region 103 shown in FIG. 1. As shown in FIG. 2, the light rays emitted from pixels of the two-dimensional image display apparatus (such as a liquid crystal display or a CRT display) enter lenses 201, where they are output to the front surface of the display with their traveling directions and distributions controlled. The light rays reaching the eyes of an observer cause the observer to feel, by virtue of the binocular parallax, as if an object exists along the depth of the display apparatus, as is shown in FIG. 3. Namely, the observer views a stereoscopic model. The parallax number in FIG. 2 is a number assigned to the pixels positioned at the same position relative to a lens.

For instance, a preset reference point is set on the lens, and serial numbers serving as parallax numbers are assigned to pixels positioned sequentially. Further, the maximum number of the parallax numbers will hereinafter be referred to as a parallax count, display data to be illuminated on the display surface be referred to as an elemental image, and the image comprising the pixels of a corresponding parallax number be referred to as a tile image (see FIG. 4). Each of the examples denoted by "A" to "F" in FIG. 4 includes a single elemental image that comprises three pixels 202 with parallax numbers (1), (2) and (3). Further, in FIG. 4, each tile image has a width of 3 and a height of 2.

Figure 5:
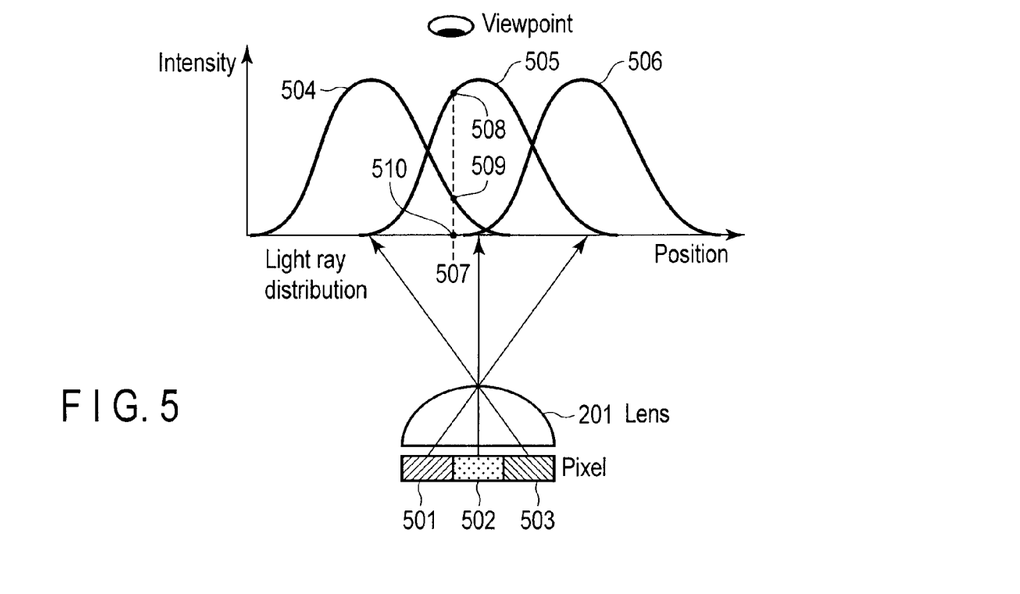
FIG. 5 is an exemplary view useful in explaining the cause of multiple blurred images.

A description will be given of the light reaching one eye of an observer at a certain viewpoint. To facilitate the description, the 1D-II scheme will be described as an example. FIG. 5 shows light ray distributions of the case where there are one lens 201 and three tile images, and the width and height of each tile image are both 1 (1 pixel in this case). The light ray emitted from one pixel enters the lens and is output in a controlled direction. Since the light ray is scattered, its intensity measured at a certain distance from the lens distributes in a certain range as shown in FIG. 5. In FIG. 5, the horizontal axis indicates the position, and the vertical axis indicates the intensity. More specifically, reference number 506 denotes the light ray distribution of a pixel 501, reference number 505 denotes the light ray distribution of a pixel 502, and reference number 504 denotes the light ray distribution of a pixel 503. When the observer sees this lens from a certain viewpoint, the light reaching their eyes is a mixture (indicating, for example, a mixed color) of the values of the pixels in accordance with the light ray distributions. For instance, the light reaching the eyes when the lens is seen from a position 507 is the weighted sum of the values of the pixels 501, 502 and 503, obtained using, as the respective weights, the values 508, 509 and 510 of the light ray distributions assumed at the position 507.

Figure 6:
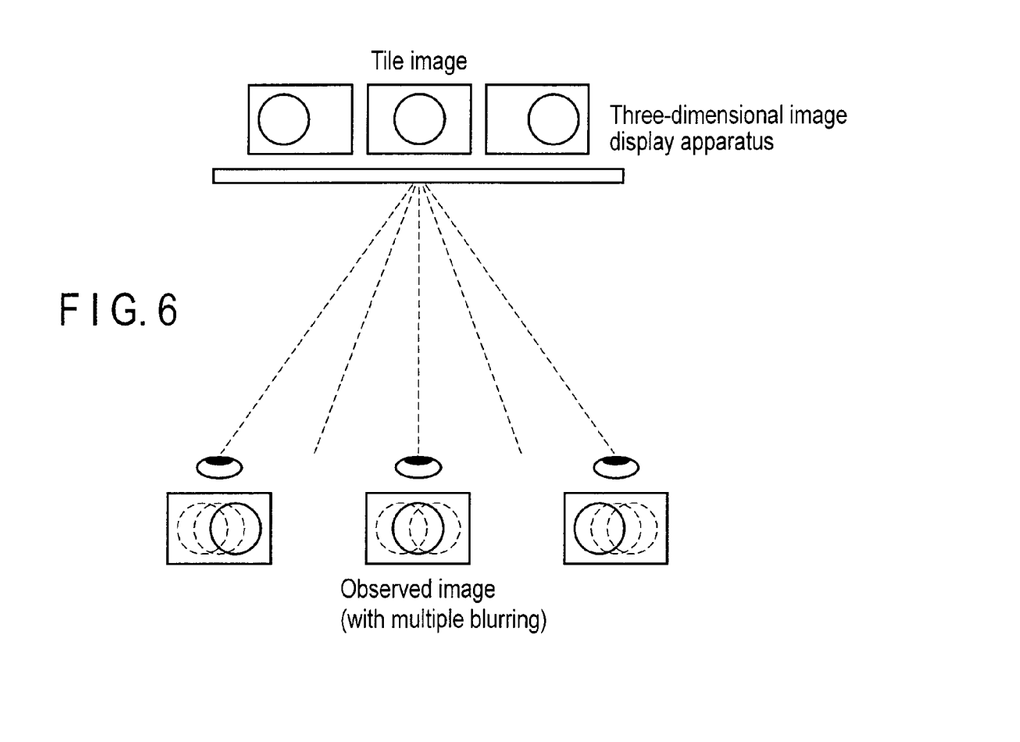
FIG. 6 is an exemplary conceptual diagram illustrating a state in which multiple blurring occurs.

Also in the case of a plurality of lenses, the observed image obtained when the II three-dimensional image display apparatus is seen by one eye from a certain viewpoint is an overlap image obtained when the pixels of the tile images are overlapped with their light ray intensity distributions at the viewpoint. As aforementioned, each tile image is shifted corresponding to an object in position to provide a binocular parallax effect. Accordingly, the image obtained by overlapping the tile images inevitably has multiple blurring. For instance, as shown in FIG. 6, if each tile image is set as a combination of images obtained by capturing images of the same object from different positions, the observed image seen from a certain viewpoint is a combination of images captured from different positions, and therefore has multiple blurring. Since thus, the light ray distribution varies depending upon the viewpoint, different observed images are obtained from different viewpoints.

Although in this embodiment, an example case where the parallax count is 3 is described, the parallax count may be set to an arbitrary value. For instance, it may be set to 9. Also in this case, a description similar to the above can be given.

First Embodiment

Figure 7:
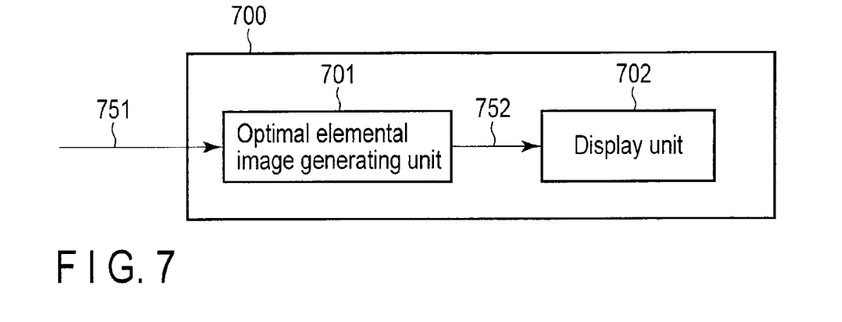
FIG. 7 is an exemplary block diagram illustrating a three-dimensional image display apparatus according to a first embodiment.

Referring then to FIG. 7, a description will be given of a three-dimensional image display apparatus 700 according to a first embodiment. FIG. 7 is a block diagram illustrating the three-dimensional image display apparatus 700.

The three-dimensional image display apparatus 700 of the first embodiment comprises an optimal elemental image generating unit 701, and a display unit 702. The optimal elemental image generating unit 701 generates an optimal elemental image. The display unit 702 includes the two-dimensional display apparatus 101 and the light ray control element 102.

The optimal elemental image generating unit 701 receives an initial elemental image 751, and generates an optimal elemental image 752 based on the initial elemental image 751. The initial elemental image 751 is an elemental image generated by the method disclosed in, for example, JP-A 2004-212666 (KOKAI). Alternatively, the optimal elemental image generating unit 701 may generate the optimal elemental image 752 based on, for example, an original image prepared before the generation of the initial elemental image. The optimal elemental image generating unit 701 determines at least one pixel value based on the weighted sum of two or more pixel values of the initial elemental image 751 as a tentative elemental image generated or received, and weights calculated from light ray distributions, thereby transforming the initial elemental image 751 so that no multiple blurring occurs in an observed image to generate the optimal elemental image 752.

The display unit 702 comprises the two-dimensional display apparatus 101 and the light ray control elements 102. The two-dimensional display apparatus 101 has a display surface with a plurality of pixels arranged thereon in a matrix, and displays images on the two-dimensional surface. The light ray control elements 102 are provided on the display surface of the two-dimensional image display apparatus at positions corresponding to the elemental images as the display data of the pixels, and are designed to control the light rays emitted from the pixels.

Figure 8:
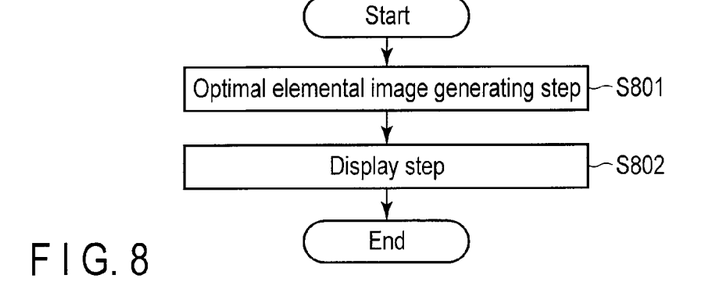
FIG. 8 is an exemplary flowchart illustrating an operation example of the three-dimensional image display apparatus according to the first embodiment.

Referring to FIGS. 7 and 8, an operation example of the three-dimensional image display apparatus 700 of the first embodiment will be described. FIG. 8 is a flowchart useful in explaining the operation example of the three-dimensional image display apparatus 700 of the first embodiment.

At step S801, the optimal elemental image generating unit 701 receives the initial elemental image 751, and generates the optimal elemental image 752 based on the initial elemental image.

At step S802, the display unit 702 receives the optimal elemental image 752 to thereby display a three-dimensional image for the observer.

Figure 9:
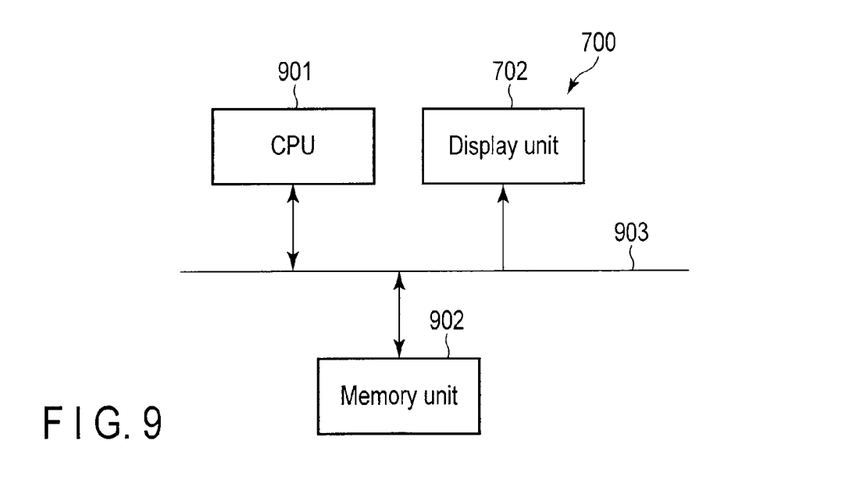
FIG. 9 is an exemplary view illustrating the hardware configuration of the three-dimensional image display apparatus according to the first embodiment.

Referring then to FIG. 9, the hardware configuration of the three-dimensional image display apparatus 700 will be described. This hardware configuration is in common between the three-dimensional image display apparatus 700 of the first embodiment and three-dimensional image display apparatuses according to the other embodiments described later.

The three-dimensional image display apparatus 700 comprises a central processing unit (CPU) 901, the display unit 702 and a memory unit 902, which are connected to each other by a bus 903.

The CPU 901 uses, as a work area, a preset area in, for example, a random access memory (RAM) that is included in the memory unit 902, and performs various processes in accordance with various control programs prestored in a read only memory (ROM) that is also included in the memory unit 902, thereby totally controlling the operations of the components of the three-dimensional image display apparatus 700. Further, the CPU 901 realizes the function of the above-mentioned optimal elemental image generating unit 701 in accordance with a preset program prestored in the memory unit 902.

The memory unit 902 includes a magnetically or optically recordable recording medium. The memory unit 902 records, on the recording medium, acquired image data, and/or externally data, such as image data, input via a communication unit or an interface (not shown). For instance, the memory unit stores, in, for example, the ROM, the programs and various setting data associated with the control of the three-dimensional image display apparatus 700 so that they cannot be rewritten. Further, the RAM is, for example, an SDRAM, and functions as the work area for the CPU 901 and also functions as, for example, a buffer.

In the above-described first embodiment, the optimal elemental image 752 that does not provide multiple blurring in an observed image is generated by weighted sum, thereby suppressing multiple blurring in the image.

Second Embodiment

Figure 10:
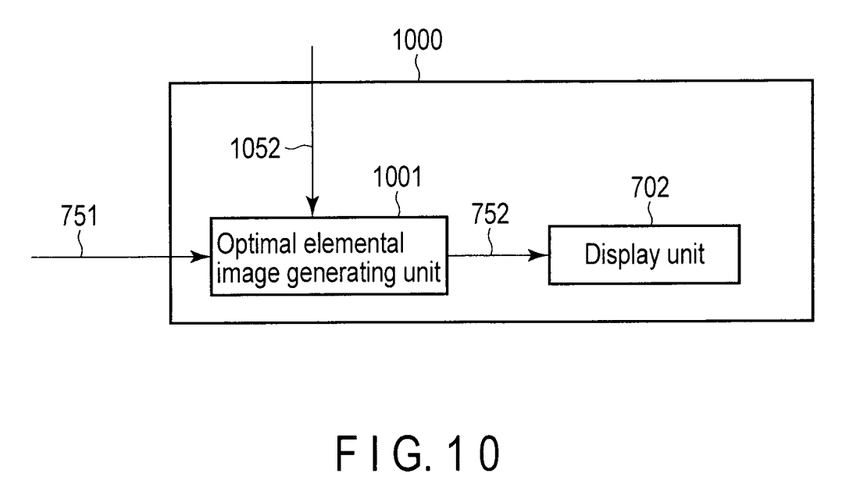
FIG. 10 is an exemplary block diagram illustrating a three-dimensional image display apparatus according to a second embodiment.

Referring now to FIG. 10, a description will be given of a three-dimensional image display apparatus 1000 according to a second embodiment. FIG. 10 is a block diagram illustrating the three-dimensional image display apparatus 1000 of the second embodiment. The second embodiment differs from the first embodiment in the optimal elemental image generating unit.

An optimal elemental image generating unit 1001 incorporated in the second embodiment receives not only the initial elemental image 751 but also a target image 1052, and generates the optimal elemental image 752 based on these images. The target image 1052 is an image displayed on the display unit, that is desired to be viewed when the observer sees the three-dimensional image display apparatus 1000 by one eye at least from one viewpoint.

Figure 11:
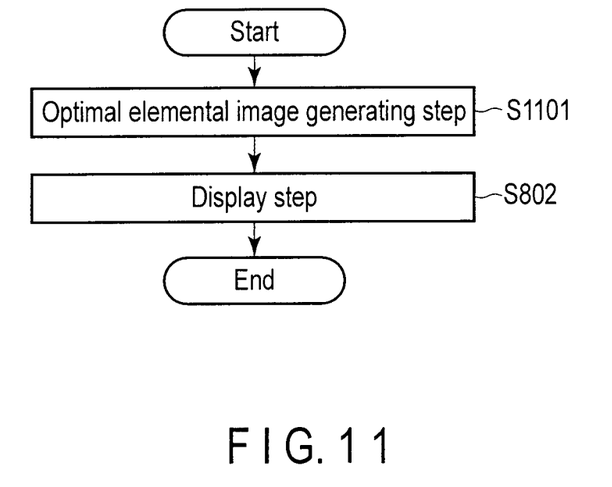
FIG. 11 is an exemplary flowchart illustrating an operation example of the three-dimensional image display apparatus according to the second embodiment.

Referring to FIGS. 10 and 11, an operation example of the three-dimensional image display apparatus 1000 of the second embodiment will be described. FIG. 11 is a flowchart useful in explaining the operation example of the three-dimensional image display apparatus 1000 of the second embodiment.

Figure 12:
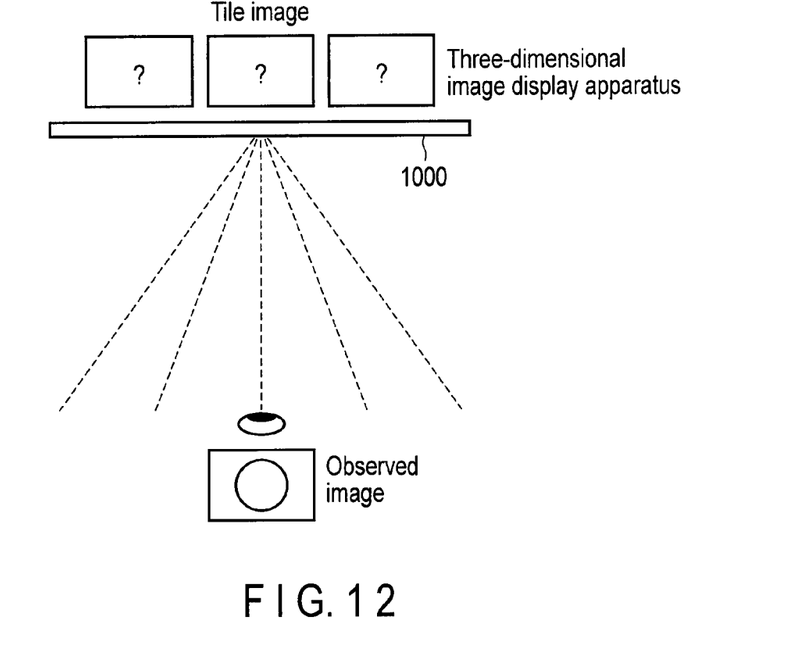
FIG. 12 is an exemplary conceptual view illustrating a problem solving method employed in the second embodiment.

At step S1101, the optimal elemental image generating unit 1001 receives the initial elemental image 751 and the target image 1052, and generates the optimal elemental image 752 based on these images. More specifically, the optimal elemental image generating unit 1001 acquires the weighted sum of two or more pixel values included in the target image 1052 and the weights calculated from the light ray distributions to determine at least one pixel value, thereby transforming the initial elemental image 751 so that the observed image is close to the target image as shown in FIG. 12, and generating the optimal elemental image 752.

The image desired to be viewed by the observer from an arbitrarily set viewpoint is set as the target image. For instance, if the parallax image obtained by capturing, from the position corresponding to the set viewpoint, an image of an object to be displayed on the three-dimensional image display apparatus 1000 is selected from a plurality of parallax images obtained by capturing images of the object from different positions, and is used as the target image, it exhibits no multiple blurring to the observer. Since the viewpoint for setting the target image restricts, to the target image, the observed image seen from the viewpoint, it will hereinafter be referred to as a restricting viewpoint. Further, the target image does not always have to be selected from a plurality of parallax images obtained by capturing images of the object from different positions. Alternatively, the target image may include an image totally different from the image of the object. In this case, the optimal elemental image generating unit must receive the target image. In other words, the image that can be seen on the three-dimensional image display apparatus 1000 of the second embodiment if the target image includes an image totally different from the initial elemental image cannot be seen on the three-dimensional image display apparatus 700 of the first embodiment. In contrast, if the target image on the three-dimensional image display apparatus 1000 of the second embodiment is included in the initial elemental image, it can also be seen on the three-dimensional image display apparatus 700 of the first embodiment.

A method example for calculating the weight and for transforming the initial elemental image will be described.

Figure 13:
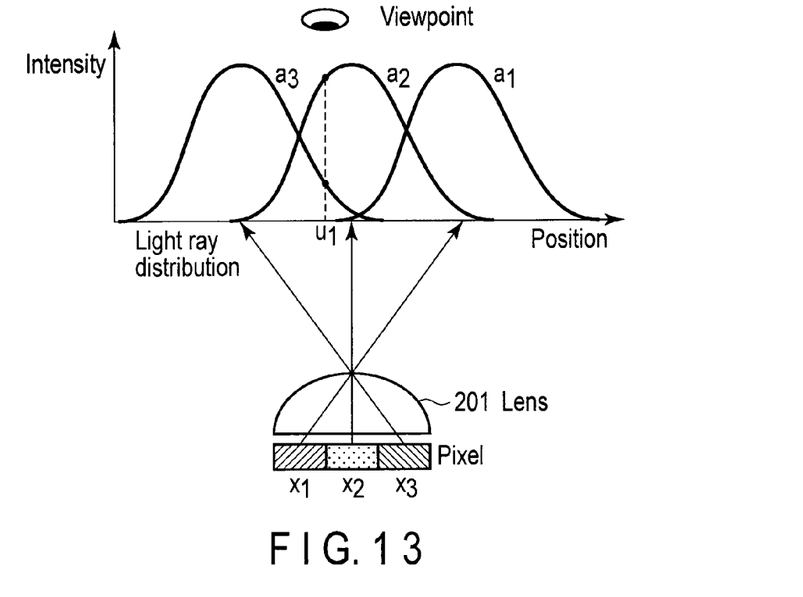
FIG. 13 is an exemplary view useful in explaining the content of processing in the second embodiment.

To facilitate the understanding, a description will be given the case shown in FIG. 13, where one lens 201, one restricting viewpoint ($u_1$) and three tile images are employed, and each tile image has a width of 1 and a height of 1. Assume here that the luminances of the three tile images (each of which is formed of only one pixel in this case) displayed on the two-dimensional image display apparatus are set to $x_1$, $x_2$ and $x_3$, respectively, and that the functions indicating the intensity distributions of the light rays emitted from pixels i (i=1, 2, 3) associated with each viewpoint position u, i.e., the functions indicating the light ray distributions associated with the pixels i (i=1, 2, 3) at position u, are set to $a_1(u)$, $a_2(u)$ and $a_3(u)$, respectively. The observed image seen from the viewpoint $u_1$ is formed of a single pixel, and the luminance $y(u_1)$ of the single pixel is given by the following equation (1):

$$y(u_1) = \sum_{i=1}^{3} a_i(u_1) x_i \tag{1}$$

From this equation, it is understood that to allow an image $y(u_1)$ or an image close thereto to be seen from the viewpoint $u_1$, the luminances $x_1$, $x_2$ and $x_3$ that minimize the energy function given by the following equation (2) should be set as those of the tile images. Namely, assuming that $y(u_1)$, $a_1(u)$, $a_2(u)$ and $a_3(u)$ are known values, $x_1$, $x_2$ and $x_3$ that minimize the energy function are calculated.

$$E = \left( y(u_1) - \sum_{i=1}^{3} a_i(u_1) x_i \right)^2 \tag{2}$$

The energy function obtained by generalizing the above example is given by the following equation (3):

$$E = \|AX - Y\|^2 \tag{3}$$

where X is a vector corresponding to the pixel count of the elemental image to acquire, Y is a vector including, as components, the pixel values of a target image obtained from one or more restricting viewpoints, and A is a matrix formed of the values of light ray distributions detected from restricting viewpoints.

The optimal elemental image 752 that minimizes the above-mentioned energy function is given by the following equation (4):

$$\hat{X} = \underset{x}{\arg\min} E \tag{4}$$

This equation is obtained using, for example, a Moore and Penrose generalized inverse matrix defined by the following equation (5):

$$\hat{X} = A^\dagger Y + (I - A^\dagger A) Z \tag{5}$$

where $A^\dagger$ is the Moore and Penrose generalized inverse matrix, I is a unit matrix, and Z is an arbitrary vector having the same size as X. If the number of restricting viewpoints is less than the parallax count, an underdetermined problem will be involved. To uniquely determine the solution, it is necessary to set the value of Z. In the following description, the value determined as Z is represented by $Z_0$. For instance, to prevent degradation of the image quality obtained when seen from any viewpoint other than the restricted ones, the initial elemental image 751 may be used as $Z_0$.

Further, if the number of restricting viewpoints is larger than the parallax count (which involves an overdetermined problem), the optimal elemental image given by the equation (4) for minimizing the energy function given by the equation (3) is expressed by the following equation (6). In this case, the optimal elemental image generating unit 1001 does not receive the initial elemental image 751 and only receives the target image 1052. The inverse matrix $A^\dagger$ can be beforehand calculated and stored as a table in the optimal elemental image generating unit 1001. No block diagram is presented for this case, but the case where there is no initial elemental image 751 in FIG. 10 corresponds to it.

$$\hat{X} = A^\dagger Y \tag{6}$$

Since the matrix A is unique to the light ray control elements of the three-dimensional image display apparatus 1000 and to the restricting viewpoints for setting the target image, the generalized inverse matrix $A^\dagger$ can be beforehand calculated if the restricting viewpoints are predetermined. Namely, if the restricting viewpoints are predetermined, the generalized inverse matrix $A^\dagger$ can be beforehand stored as a table in the three-dimensional image display apparatus 1000. The three-dimensional image display apparatus 1000 stores the table of the generalized inverse matrix $A^\dagger$ in, for example, a ROM 904. Further, when the target image Y can be expressed by linear transform of $Z_0$, Y is given by the following equation (7):

$$Y = TZ_0 \tag{7}$$

where T is a matrix for transforming $Z_0$ to Y. If the equation (7) is substituted into the equation (5), and if Z is replaced with $Z_0$, the following equation (8) can be obtained:

$$\hat{X} = HZ_0 \tag{8}$$

where H is given by the following equation:

$$H = A^\dagger T + I - A^\dagger A$$

The matrix H is an example of a group of weights mentioned above. The weights can be stored in the form of a table in the optimal elemental image generating unit 1001. For instance, the values included in the table may be determined during manufacturing of the apparatus. In the II scheme, the aforementioned filter can be provided for each group of pixels corresponding to the parallax count corresponding to one lens. In the case of, for example, the 1D-II scheme shown in FIG. 13, $Z_0$ is a vector including, as components, pixel values $x_1$, $x_2$ and $x_3$ arranged in line, X is a three-dimensional vector, and H is a (3, 3) matrix. Accordingly, each element of $\hat{X}$, i.e., each pixel in the optimal elemental image generating unit 1001 can be calculated using a three-tap filter for $Z_0$. If the parallax count is a value (9, for example) other than the above-mentioned 3, the weights can be calculated in the same way as the above.

Further, the optimal elemental image 752 given by the equation (4) can be calculated using iterative computation such as a steepest descent method or a conjugate gradient method. Also when using the iterative computation, this computation can be expressed by an arithmetic expression similar to the equation (8). For instance, when the maximum decreasing method is used as the iterative computation method, the $(t+1)^{th}$ iterative process is given by the following equation (9):

$$X_{t+1} = X_t - \epsilon A^T(AX_t - Y) \tag{9}$$

where $\epsilon$ is a constant. At this time, if Y can be expressed by linear transform of $X_t$, it is given by $$Y = T_t' X_t \tag{10}$$

where $T_t'$ is a matrix for transforming $X_t$ to Y. If the equation (10) is substituted into the equation (9), the following equation (11) is obtained:

$$X_{t+1} = H_t' X_t \tag{11}$$

where $H_t'$ is given by the following equation:

$$H_t' = (\epsilon A^T T_t' + I - \epsilon A^T A)$$

In the case of iterating the iterative processing n times, the left-hand side of the equation (4) is given by $$\hat{X} = X_n = H_{n-1}' \ldots H_0' X_0 \tag{12}$$

where the initial elemental image 751 can be used as $X_0$ in order to avoid degradation of the image quality from viewpoints other than the restricting viewpoints.

Modification

Modification of Energy Function

As the above-mentioned energy function, the energy function given by the following equation (13), in which regularization terms are added, may be used:

$$E = \|AX - Y\|^2 + \alpha\|RX\|^2 + \beta\|X - Z\|^2 \tag{13}$$

where R is a matrix representing a differentiation, $\alpha$ and $\beta$ are constants, and Z is a vector of the same size as X. For instance, to avoid degradation of the image quality from viewpoints other than the restricting viewpoints, the initial elemental image 751 can be used as Z. The left-hand side of the equation (4) for minimizing the energy function given by the equation (13) can be obtained using the Moore and Penrose generalized inverse matrix defined by the following equation (14):

$$\hat{X} = (A^T A + \alpha R^T R + \beta I)^\dagger (A^T Y + \beta Z) \tag{14}$$

Further, the left-hand side of the equation (4) can also be obtained by using the following energy function (15) and applying, to this energy function, the iterative computation, such as the steepest descent method or the conjugate gradient method:

$$E = \|AX - Y\|^2 + \alpha\|RX\|^2 \tag{15}$$

For instance, when using the steepest descent method as the iterative computation method, the $(t+1)^{th}$ iterative process is given by the following equation (16):

$$X_{t+1} = X_t - \epsilon\{A^T = (AX_t - Y) + \alpha R^T R X_t\} \tag{16}$$

where $\epsilon$ is a constant. At this time, if Y can be expressed by linear transform of $X_t$, it is given by the following equation (17):

$$Y = T_t' X_t \tag{17}$$

where $T_t'$ is a matrix for transforming $X_t$ to Y. If the equation (17) is substituted into the equation (16), the following equation (18) is obtained:

$$X_{t+1} = H_t'' X_t \tag{18}$$

where $H_t''$ is given by $$H_t'' = (\epsilon A^T T_t' + I - \epsilon A^T A - \epsilon \alpha R^T R)$$

In the case of iterating the iterative processing n times, the left-hand side of the equation (4) is given by $$\hat{X}=X_n=H_{n-1}''\ldots H_0''X_0 \quad (19)$$

where the initial elemental image 751 can be used as $X_0$ in order to avoid degradation of the image quality from viewpoints other than the restricting viewpoint(s).

Note that a single restricting viewpoint or a plurality of restricting viewpoints may be employed, and that the amount of processing does not change even if the number of restricting viewpoints is changed, because the scale of the matrix used for computation does not change.

Thus, even when such a modified energy function as expressed by the equation (13) is used, multiple blurring can be reduced, because an image free from multiple blurring is used as the target image, and the optimal elemental image 752 is generated by a weighted sum so that the observed image will coincide with the target image. Further, since a black pixel is not inserted into the elemental image, the luminance of the observed image is not reduced. Furthermore, by virtue of the effect of the regularization term, discontinuity is prevented from occurring in the optimal elemental image as the left-hand side of the equation (4), thereby enabling generation of a natural optimal elemental image.

In the above-described second embodiment, an image free from multiple blurring is used as the target image, and the optimal elemental image 752 is generated by a weighted sum so that the observed image will coincide with the target image, thereby reducing multiple blurring. Further, since the target image can be set arbitrarily, the image observed from a restricting viewpoint can be designed arbitrarily.

Third Embodiment

Figure 14:
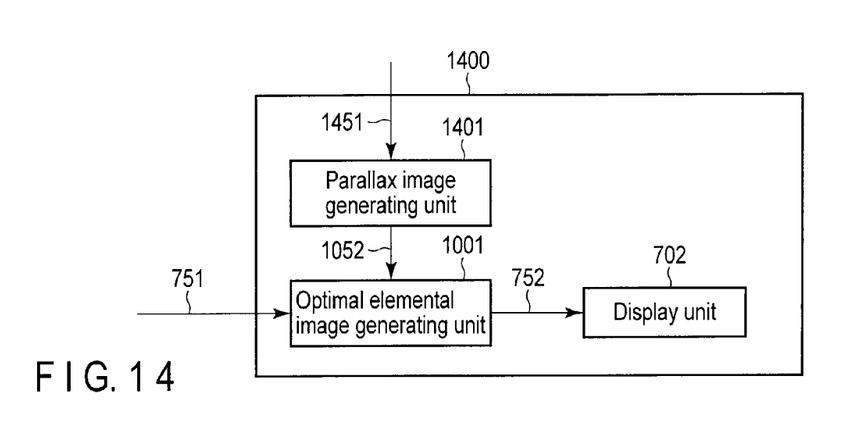
FIG. 14 is an exemplary block diagram illustrating a three-dimensional image display apparatus according to a third embodiment.

Referring then to FIG. 14, a description will be given of a three-dimensional image display apparatus 1400 according to a third embodiment. The three-dimensional image display apparatus 1400 of the third embodiment is obtained by adding a parallax image generating unit 1401 to the three-dimensional image display apparatus 1000 of the second embodiment.

The parallax image generating unit 1401 receives modeling data 1451, and generates parallax images to be seen from one or more preset viewpoints, and outputs the parallax images as target images 1052. The modeling data 1451 represents three-dimensional coordinates and luminance values of an object to be displayed on the three-dimensional image display apparatus 1400. The parallax image generating unit 1401 receives modeling data 1451, and generates parallax images by performing, for example, computer graphics (CG) rendering.

Figure 15:
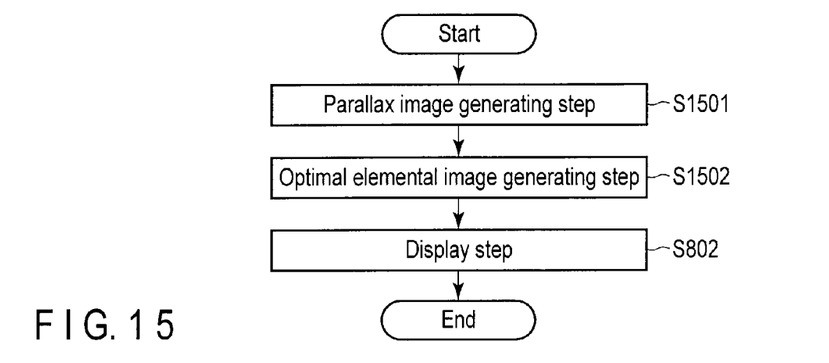
FIG. 15 is an exemplary flowchart illustrating an operation example of the three-dimensional image display apparatus according to the third embodiment.

Referring to FIGS. 14 and 15, a description will be given of the part of the operation of the three-dimensional image display apparatus 1400 according to the third embodiment, which differs from the second embodiment. FIG. 15 is a flowchart useful in explaining an operation example of the three-dimensional image display apparatus 1400 according to the third embodiment.

At step S1501, the parallax image generating unit 1401 receives modeling data 1451, and generates parallax images to be seen from one or more preset viewpoints, and outputs the parallax images as target images 1052.

As described above, in the third embodiment, multiple blurring can be reduced, because the optimal elemental image 752 is generated by a weighted sum so that the observed image will coincide with the target image. Further, since the parallax images serving as the target images can be arbitrarily generated from modeling data, it is not necessary to beforehand acquire parallax images by image capturing from restricting viewpoints.

Fourth Embodiment

Figure 16:
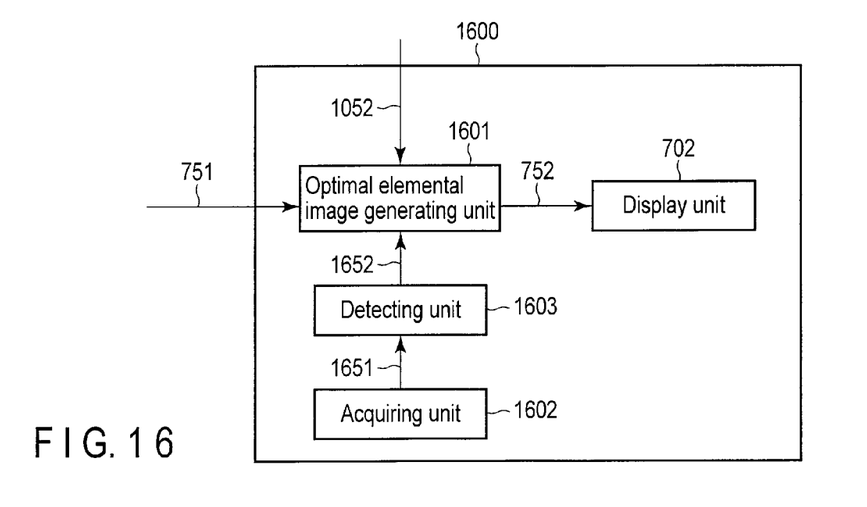
FIG. 16 is an exemplary block diagram illustrating a three-dimensional image display apparatus according to a fourth embodiment.

Referring now to FIG. 16, a description will be given of a three-dimensional image display apparatus 1600 according to a fourth embodiment. The three-dimensional image display apparatus 1600 of the fourth embodiment is obtained by adding a detecting unit 1603 and an acquiring unit 1602 to the three-dimensional image display apparatus 1000 of the second embodiment.

Figure 18:
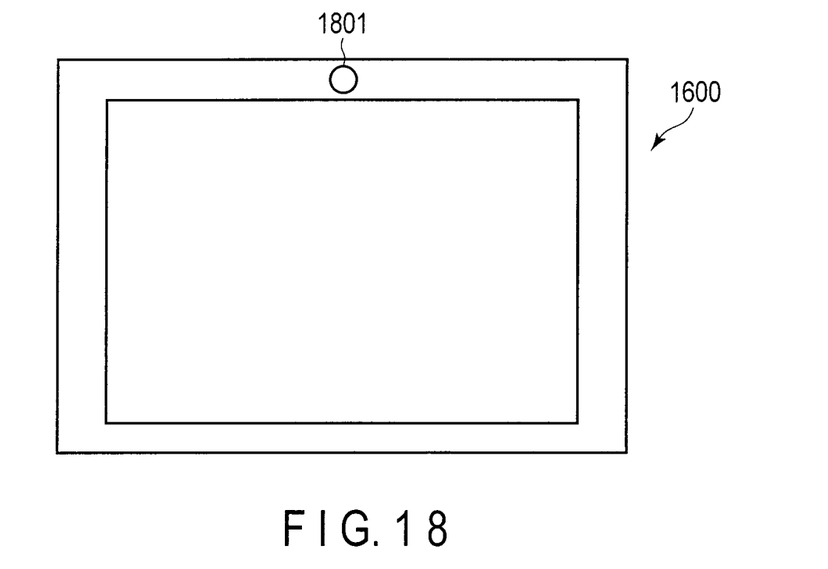
FIG. 18 is an exemplary view illustrating the external appearance of a three-dimensional image display apparatus according to the fourth embodiment.

As shown in FIG. 18, the three-dimensional image display apparatus 1600 of the fourth embodiment incorporates a camera 1801 for detecting the position of the head of an observer who is viewing the display apparatus 1600.

The acquiring unit 1602 acquires a image from the camera 1801 and outputs a camera image 1651.

The detecting unit 1603 receives the camera image 1651 and detects, by face detection, the face area of at least one observer from the camera image 1651, then sets the position of the right eye or left eye or the positions of both eyes, and determines the spatial X- and Y-coordinates of the observer as seen from the three-dimensional image display apparatus 1600. As the position of the eyes, the position in the face area, at which it is statistically most strongly possible that the eyes exist, can be set. Alternatively, the position of the right eye or left eye or the positions of both eyes can be directly set by eye detection based on the camera image 1651. Yet alternatively, based on the size of the face in the camera image 1651, the distance between the observer and the three-dimensional image display apparatus 1600 can be estimated to thereby detect the spatial Z-coordinate of the observer as seen from the three-dimensional image display apparatus 1600. At least one of the X-, Y- and Z-coordinates is output as observer position data 1652.

An optimal elemental image generating unit 1601 receives the initial elemental image 751, the target image 1052 and the observer position data 1652, and generates the optimal elemental image 752 in the same way as the optimal elemental image generating unit 1001 of the second embodiment, except that the observer position data 1652 is used as restricting viewpoint data.

Figure 17:
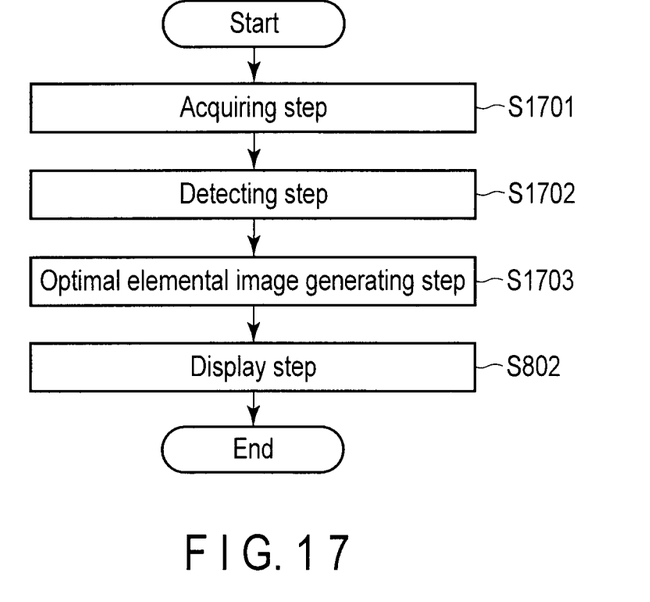
FIG. 17 is an exemplary flowchart illustrating an operation example of the three-dimensional image display apparatus according to the fourth embodiment.

Referring to FIGS. 16 and 17, a description will be given of the operation of the three-dimensional image display apparatus 1600 of the fourth embodiment. FIG. 17 is a flowchart useful in explaining an operation example of the three-dimensional image display apparatus 1600 of the fourth embodiment.

At step S1701, the acquiring unit 1602 acquires a image from the camera 1801 and outputs a camera image 1651.

At step S1702, the detecting unit 1603 receives the camera image 1651, and detects the area of the face of at least one observer by face detection based on the camera image 1651, thereby setting the positions of the right eye or the left eye, or the positions of both eyes to determine the spatial X- and Y-coordinates of the observer as seen from the three-dimensional image display apparatus 1600.

At step S1703, the optimal elemental image generating unit 1601 receives the initial elemental image 751, the target image 1052 and the observer position data 1652, and generates the optimal elemental image 752 in the same way as the optimal elemental image generating unit 1001 of the second embodiment, except that the observer position data 1652 is used as restricting viewpoint data.

As described above, in the three-dimensional image display apparatus 1600 of the fourth embodiment, the optimal elemental image 752 is generated by a weighted sum so that the observed image will coincide with the target image, thereby reducing multiple blurring. Further, in the fourth embodiment, since the optimal elemental image can be generated in accordance with the position of at least one observer detected by the camera 1801, the target image can be recognized at the position of the right or left eye of the at least one observer, or at the position of both eyes. This differs from the second embodiment in which the target image can be recognized only at a preset restricting viewpoint (or at preset restricting viewpoints).

In the above-described fourth embodiment, multiple blurring can be reduced without reducing the luminance of the display image.

For instance, if one of the adjacent two pixels is made to display black so as to reduce multiple blurring, the overlap of the light ray distributions of these pixels and other pixels can be reduced. However, insertion of black pixels in the elemental image will reduce the luminance of the observed image. In the fourth embodiment, multiple blurring can be reduced without reducing the luminance of the display image.

In the above-described three-dimensional image display apparatuses, the parallax image generating unit 1401, the acquiring unit 1602, the detecting unit 1603 and the optimal elemental image generating units 701, 1001 and 1601 can be realized by causing a processor installed in a versatile computer to execute a program. In this case, the program may be beforehand directly installed in the computer. Alternatively, the program may be stored in a recording medium, such as a CD-ROM, and be read therefrom to the computer. Yet alternatively, the program may be downloaded to the computer via a network.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A three-dimensional image display apparatus, comprising:
    a display unit comprising a two-dimensional image display device comprising a display surface with a plurality of pixels arranged in a matrix, and a plurality of light ray control elements provided on the display surface of the two-dimensional image display device corresponding to the pixels, the light ray control elements being configured to control light rays from the pixels, an intensity of each of the light rays measured at a distance from the lens distributing in a range; and
    an optimal elemental image generating unit configured to generate an optimal elemental image by determining a value of at least one pixel from a weighted sum of values of at least two pixels of a generated image or an input image, and weights calculated based on light ray distributions indicating directions and scattering degrees of light rays from the light ray control elements,
    the display unit displaying the optimal elemental image,
    wherein the optimal elemental image generating unit receives a target image displayed on the display unit from at least one predetermined viewpoint, and wherein the optimal elemental image generating unit obtains weights for reducing an energy function indicating a difference between the target image and an overlap image viewed from the predetermined viewpoint and calculated from the light ray distributions.

2. The apparatus according to claim 1, wherein the optimal elemental image generating unit calculates the weights based on a gradient of the energy function.

3. The apparatus according to claim 1, wherein the weight reduces the energy function, and the optimal elemental image generating unit calculates the weights based on a generalized inverse matrix of a matrix determined from the light ray distributions.

4. The apparatus according to claim 1, wherein the target image is a parallax image that is selected from a plurality of parallax images to be displayed on the three-dimensional image display apparatus, and that is captured from a position corresponding to the predetermined viewpoint.

5. The apparatus according to claim 1, further comprising a parallax image generating unit configured to generate a parallax image to be viewed from an arbitrary viewpoint, based on three-dimensional coordinates and a luminance of an object to be displayed on the three-dimensional image display apparatus,
    wherein the optimal elemental image generating unit receives the parallax image as the target image.

6. The apparatus according to claim 1, further comprising:
    a camera configured to detect a face area of an observer who is viewing the three-dimensional image display apparatus;
    an acquisition unit configured to acquire a camera image captured by the camera; and
    a detecting unit configured to detect, in the camera image, an observer position indicating the face area of the observer,
    wherein the optimal elemental image generating unit generates the optimal elemental image using the observer position as the predetermined viewpoint.

7. A three-dimensional image display apparatus, comprising:

a display unit comprising a two-dimensional image display device comprising a display surface with a plurality of pixels arranged in a matrix, and a plurality of light ray control elements provided on the display surface of the two-dimensional image display device corresponding to the pixels, the light ray control elements being configured to control light rays from the pixels, an intensity of each of the light rays measured at a distance from the lens distributing in a range; and an optimal elemental image generating unit configured to generate an optimal elemental image by determining a value of at least one pixel from a weighted sum of values of at least two pixels of a target image displayed on the display unit from at least one predetermined viewpoint, and weights calculated based on light ray distributions indicating directions and scattering degrees of light rays from the light ray control elements, the display unit displaying the optimal elemental image, wherein the optimal elemental image generating unit receives a target image displayed on the display unit from at least one predetermined viewpoint, and wherein the optimal elemental image generating unit obtains weights for reducing an energy function indicating a difference between the target image and an overlap image viewed from the predetermined viewpoint and calculated from the light ray distributions.

8. The apparatus according to claim 7, wherein the optimal elemental image generating unit calculates the weights based on a gradient of the energy function.

9. The apparatus according to claim 7, wherein the weight reduces the energy function, and the optimal elemental image generating unit calculates the weights based on a generalized inverse matrix of a matrix determined from the light ray distributions.

10. The apparatus according to claim 7, wherein the target image is a parallax image that is selected from a plurality of parallax images to be displayed on the three-dimensional image display apparatus, and that is captured from a position corresponding to the predetermined viewpoint.

11. The apparatus according to claim 7, further comprising a parallax image generating unit configured to generate a parallax image to be viewed from an arbitrary viewpoint, based on three-dimensional coordinates and a luminance of an object to be displayed on the three-dimensional image display apparatus, wherein the optimal elemental image generating unit receives the parallax image as the target image.

12. The apparatus according to claim 7, further comprising:

a camera configured to detect a face area of an observer who is viewing the three-dimensional image display apparatus;

an acquisition unit configured to acquire a camera image captured by the camera; and a detecting unit configured to detect, in the camera image, an observer position indicating the face area of the observer, wherein the optimal elemental image generating unit generates the optimal elemental image using the observer position as the predetermined viewpoint.

13. A three-dimensional image display method, comprising:

preparing a display unit comprising a two-dimensional image display apparatus comprising a display surface with a plurality of pixels arranged in a matrix, and a plurality of light ray control elements provided on the display surface of the two-dimensional image display device corresponding to the pixels, the light ray control elements controlling light rays from the pixels, an intensity of each of the light rays measured at a distance from the lens distributing in a range; and generating an optimal elemental image by determining a value of at least one pixel from a weighted sum of values of at least two pixels of a generated image or an input image, and weights calculated based on light ray distributions indicating directions and scattering degrees of light rays from the light ray control elements, the display unit displaying the optimal elemental image, wherein the generating an optimal element image further comprises receiving a target image displayed on the display unit from at least one predetermined viewpoint, and wherein the generating an optimal element image further comprises obtaining weights for reducing an energy function indicating a difference between the target image and an overlap image viewed from the predetermined viewpoint and calculated from the light ray distributions.

14. A three-dimensional image display method, comprising:

preparing a display unit comprising a two-dimensional image display apparatus comprising a display surface with a plurality of pixels arranged in a matrix, and a plurality of light ray control elements provided on the display surface of the two-dimensional image display device in accordance with positions of elemental images as display data items corresponding to the pixels, the light ray control elements controlling light rays from the pixels, an intensity of each of the light rays measured at a distance from the lens distributing in a range; and generating an optimal elemental image by determining a value of at least one pixel from a weighted sum of values of at least two pixels of a target image displayed on the display unit from at least one predetermined viewpoint, and weights calculated based on light ray distributions indicating directions and scattering degrees of light rays from the light ray control elements, the display unit displaying the optimal elemental image, wherein the generating an optimal element image further comprises receiving a target image displayed on the display unit from at least one predetermined viewpoint, and wherein the generating an optimal element image further comprises obtaining weights for reducing an energy function indicating a difference between the target image and an overlap image viewed from the predetermined viewpoint and calculated from the light ray distributions.

15. A non-transitory computer readable medium including computer executable instructions, wherein the instructions, when executed by a processor, cause the processor to perform a method, comprising:

preparing a display unit comprising a two-dimensional image display apparatus comprising a display surface with a plurality of pixels arranged in a matrix, and a plurality of light ray control elements provided on the display surface of the two-dimensional image display device corresponding to the pixels, the light ray control elements controlling light rays from the pixels, an intensity of each of the light rays measured at a distance from the lens distributing in a range; and generating an optimal elemental image by determining a value of at least one pixel from a weighted sum of values of at least two pixels of a generated image or an input image, and weights calculated based on light ray distributions indicating directions and scattering degrees of light rays from the light ray control elements, the display unit displaying the optimal elemental image, wherein the generating an optimal element image further comprises receiving a target image displayed on the display unit from at least one predetermined viewpoint, and wherein the generating an optimal element image further comprises obtaining weights for reducing an energy function indicating a difference between the target image and an overlap image viewed from the predetermined viewpoint and calculated from the light ray distributions.

16. A non-transitory computer readable medium including computer executable instructions, wherein the instructions, when executed by a processor, cause the processor to perform a method, comprising:

preparing a display unit comprising a two-dimensional image display apparatus comprising a display surface with a plurality of pixels arranged in a matrix, and a plurality of light ray control elements provided on the display surface of the two-dimensional image display device in accordance with positions of elemental images as display data items corresponding to the pixels, the light ray control elements controlling light rays from the pixels, an intensity of each of the light rays measured at a distance from the lens distributing in a range; and generating an optimal elemental image by determining a value of at least one pixel from a weighted sum of values of at least two pixels of a target image displayed on the display unit from at least one predetermined viewpoint, and weights calculated based on light ray distributions indicating directions and scattering degrees of light rays from the light ray control elements, the display unit displaying the optimal elemental image, wherein the generating an optimal element image further comprises receiving a target image displayed on the display unit from at least one predetermined viewpoint, and wherein the generating an optimal element image further comprises obtaining weights for reducing an energy function indicating a difference between the target image and an overlap image viewed from the predetermined viewpoint and calculated from the light ray distributions.

\* \* \* \* \*